(12) United States Patent
Livolsi et al.

(10) Patent No.: US 8,880,892 B2
(45) Date of Patent: Nov. 4, 2014

(54) SECURED EMBEDDED DATA ENCRYPTION SYSTEMS

(71) Applicant: Willow, Inc., Shokan, NY (US)

(72) Inventors: Jonathan P. Livolsi, Shokan, NY (US); Robert R. Livolsi, Shokan, NY (US)

(73) Assignee: Willow, Inc., Shokan, NY (US)

( * ) Notice: Subject to any disclaimer, the term of this patent is extended or adjusted under 35 U.S.C. 154(b) by 0 days.

(21) Appl. No.: 14/209,443

(22) Filed: Mar. 13, 2014

(65) Prior Publication Data

US 2014/0281536 A1   Sep. 18, 2014

Related U.S. Application Data

(60) Provisional application No. 61/780,527, filed on Mar. 13, 2013.

(51) Int. Cl.
    *H04L 29/06* (2006.01)
(52) U.S. Cl.
    CPC .................................. *H04L 63/0428* (2013.01)
    USPC ....................................................... 713/181
(58) Field of Classification Search
    USPC ....................................................... 713/181
    See application file for complete search history.

(56) References Cited

U.S. PATENT DOCUMENTS

| | | | |
|---|---|---|---|
| 5,221,925 A | 6/1993 | Cross | |
| 5,319,710 A * | 6/1994 | Atalla et al. | 705/75 |
| 6,962,530 B2 * | 11/2005 | Jackson | 463/29 |
| 7,058,358 B2 | 6/2006 | Cannon et al. | |
| 7,328,455 B2 * | 2/2008 | Jutzi et al. | 726/26 |
| 7,889,861 B2 | 2/2011 | Borza | |
| 8,422,673 B2 * | 4/2013 | Relyea | 380/30 |
| 2002/0003876 A1 | 1/2002 | Lim | |
| 2004/0003246 A1 * | 1/2004 | Hopkins et al. | 713/168 |
| 2004/0190868 A1 * | 9/2004 | Nakano et al. | 386/94 |
| 2012/0144451 A1 | 6/2012 | Gutt et al. | |
| 2012/0185698 A1 | 7/2012 | Fiske | |
| 2012/0250863 A1 | 10/2012 | Bukshpun et al. | |
| 2012/0309416 A1 | 12/2012 | Whelan et al. | |
| 2012/0311683 A1 | 12/2012 | Klein et al. | |

\* cited by examiner

*Primary Examiner* — Michael S McNally
(74) *Attorney, Agent, or Firm* — Kilpatrick Townsend & Stockton LLP

(57) ABSTRACT

Devices generate security vectors based on their own attributes. A device's security vectors compose its transformation matrix. The devices securely share copies of their transformation matrices with other devices. A transmitting device adds its unique MAC to packets, encrypts those packets using its own transformation matrix, and transmits those packets. A receiving device uses its copy of the transmitting device's transformation matrix to decrypt the data in a packet, determining whether a MAC extracted from that packet matches the transmitting device's MAC. The receiving device can permit or prevent further processing of the packet's data depending on whether the MACs match. Each device can store a copy of a same program that can be used to derive derivative security vectors from existing security vectors. Each device in the network can derive the same set of derivative vectors for any selected other device in the network, thereby "evolving" the transformation matrices.

18 Claims, 6 Drawing Sheets

SECURED EMBEDDED DATA ENCRYPTION SYSTEMS

The present application claims benefit under 35 U.S.C. §119(e) to U.S. Provisional Patent Application Ser. No. 61/780,527, filed Mar. 13, 2013, which is incorporated by reference in its entirety.

FIELD

The present disclosure relates to securing communications within a group of users. Communications are secured by encrypting data at a transport layer and higher layers of a communications protocol using a unique set of security vectors and message authentication code associated with each of the users and using a transformation matrix. Received encrypted data is first decrypted to provide decrypted data and a calculated message authentication code. The decrypted data is processed if the message authentication code of the transmitting user and the calculated message authentication code are equivalent.

BACKGROUND

Communications networks connecting mobile devices, personal computers, servers, mainframes, and other devices have become the accepted mode for communicating information between users. This can include anything from basic sharing of photos to the sophistication and security required by large financial and banking institutions. It is increasingly more evident that securing communications is just as important as getting the information to its intended recipient. There have been many attempts at securing information using various encryption schemes, hiding data in VPN tunnels, using third parties to authenticate the sender of data, and many others. Although these methods work as long as they are configured properly, the inherent weakness lies in the actual personal interaction required to define the known security systems that are in use today. The personal interaction adds inherent error and is ultimately the weakest link in securing the communications. Another inherent weakness arises because the vast majority of these measures are implemented using software solutions. Although a mathematically complex algorithm can be established such that breaking an encryption scheme becomes increasingly more difficult, because current computer technology is continually becoming more efficient both in terms of speed and operating power it becomes increasingly easier to break these encryptions. What took years before, now only takes months, and will eventually be able to be done in days, hours, minutes, or even just several seconds. Software-based encryption methods are complex and therefore it is extremely difficult to detect all of the flaws, thereby leaving such encryption schemes vulnerable to compromise. Before information can be exchanged over a secured communications channel it is first necessary to establish the method of encryption to be used at both ends of the channel. Otherwise, transmitted data will be unreadable by an intended recipient. In order to accomplish secured communications, a communications channel must share an encryption key that can be used to encrypt and decrypt the data. If the encryption key is not shared then the recipient will not be able to read the received data. It is also very important that the key itself is kept secure. One such way is to share the key before any communication takes place, such as writing it down and hand it to the intended recipient. Alternatively, a different encryption method can be used to share the encryption key. This can be done, for example, by using a Public/Private key pair in which two keys are used to enable the secure communication. One key is kept secret, and never shared, while the other key is shared with everyone.

Current solutions to secure and authenticate communications over a network represent only short term solutions. To make communications secure using existing methods the encryption schemes must be constantly changed or abandoned and replaced once they have become too easy to break.

SUMMARY

According to an embodiment of the invention, each device of a plurality of devices in a network maintains a unique message authentication code (MAC) that no other device in the network possesses. Each such device also generates at least one set of "seed" security vectors based on attributes and characteristics of that device and/or that device's user. Such attributes and characteristics can include, for example, biometrics of a user of the device and/or on a current global positioning system (GPS)-determined location of the device itself. Consequently, each device maintains a unique set of security vectors that reflect itself and no other device in the network. A unique set of security vectors of a device make up that device's transformation matrix; the device's security vectors can form the rows or columns of its transformation matrix, for example. After each device has generated its own transformation matrix, the devices in the network can securely share their transformation matrices with all of the other devices in the network. As a result, each device stores a copy of each other device's transformation matrix.

When a particular device needs to send data to another device securely, the transmitting device adds its own MAC to packets containing that data and then encrypts those packets using its own transformation matrix as a kind of encryption key. For example, the transmitting device can encrypt multiple Transmission Control Protocol (TCP) packets, on a packet-by-packet basis, which collectively contain the data. The transmitting device can then encapsulate the encrypted packets within one or more other packets and transmit those packets over one or more networks to an intended receiving device.

Such a receiving device can de-encapsulate the encrypted packets and can use its copy of the transmitting device's transformation matrix to decrypt the data in each received packet. The receiving device can extract a MAC from each such decrypted packet. The receiving device can determine whether the extracted MAC matches the MAC of the transmitting device. If the MACs match, then the receiving device can conclude that the packet is authentic, and can permit downstream applications and/or devices to utilize the data contained within the packet. Alternatively, if the MACs do not match, then the receiving device can conclude that the packet is not authentic, and can prevent downstream applications and/or devices from utilizing the data contained within the packet.

In one implementation, each device of the plurality of devices additionally stores a copy of an initialization program that can be used to derive derivative security vectors from existing security vectors. Thus, by applying the program to a particular device's seed vectors, a first derivative set of vectors can be produced. Similarly, by applying the program to such a first derivative set of vectors, a second derivative set of vectors can be produced. Each device in the network can generate the same set of derivative vectors for any selected other device in the network. Consequently, the devices can "evolve" the stored copies of the transformation matrices of the other devices in the network. The ever-changing nature of the transformation matrices makes the security system dynamic and more difficult to compromise. The edition of the transmitting device's transformation matrix that is used to encrypt and decrypt packets at one moment in time can vary from the edition of the same transmitting device's transformation matrix that is used to encrypt and decrypt packets at another moment in time.

In a first aspect, a method of securing communications among a plurality of devices comprising a group comprises storing a set of security vectors for each of the plurality of devices, wherein the plurality of devices comprises a transmitting device and a receiving device; storing a message authentication code for each of the plurality of devices; encrypting, using a transformation matrix comprising a set of security vectors of the transmitting device, both data to be transmitted by the transmitting device and the message authentication code of the transmitting device to provide both encrypted data and an encrypted message authentication code; transmitting the encrypted data from the transmitting device; receiving the encrypted data by the receiving device; decrypting the encrypted data using the transformation matrix comprising the set of security vectors of the transmitting device to provide both decrypted data and an extracted message authentication code; comparing the stored message authentication code of the transmitting device with the extracted message authentication code; and processing the decrypted data if the stored message authentication code of the transmitting device is equivalent to the extracted message authentication code.

In a second aspect, a method of securing communications among a plurality of devices comprising a group comprises establishing a group comprising a plurality of devices, wherein each of the plurality of devices is characterized by a set of security vectors; and the plurality of devices comprises a transmitting device and a receiving device; storing the set of security vectors for each of the plurality of devices; storing a unique message authentication code for each of the plurality of devices; encrypting, using a transformation matrix comprising the set of security vectors associated with the transmitting device, both data to be transmitted by the transmitting device and a unique message authentication code of the transmitting device; transmitting the encrypted data from the transmitting device; receiving the encrypted data at the receiving device; decrypting the encrypted data using the transformation matrix comprising the set of security vectors of the transmitting device to provide both decrypted data and an extracted message authentication code; storing a copy of the decrypted data in a buffer; comparing the stored unique message authentication code of the transmitting device with the extracted message authentication code; and processing the decrypted data if the stored unique message authentication code of the transmitting device is equivalent to the extracted message authentication code.

In a third aspect, an encryption/decryption processor comprises a storage unit for storing a set of security vectors and a message authentication code for each of a plurality of devices; an encryption unit for encrypting, using a transformation matrix based on a set of security vectors for a transmitting device, both data to be transmitted and a message authentication code of the transmitting device; a decryption unit for decrypting received data using a transformation matrix of a transmitting device to provide both decrypted data and an extracted message authentication code; a comparison unit for comparing the stored message authentication code of the transmitting device with the extracted message authentication code; and a processing unit for processing the decrypted data if the stored message authentication code of the transmitting device and the extracted message authentication code are equivalent.

In a fourth aspect, a system for secured network communications within a group comprising a plurality of devices and a network device comprises a storage unit for storing a unique set of security vectors and a message authentication code for each of a plurality of devices; an encryption unit for encrypting, using a transformation matrix comprising a set of unique security vectors of the transmitting device, both data to be transmitted by a transmitting device and a message authentication code of the transmitting device; a decryption unit for decrypting transmitted data using the transformation matrix of the transmitting device to provide both decrypted data and an extracted message authentication code; a comparing unit for comparing the stored message authentication code of the transmitting device with the extracted message authentication code; and a processing unit for processing the decrypted data if the stored message authentication code of the transmitting device and the extracted message authentication code are equivalent.

In a fifth aspect, a computer program product stored on a non-transitory computer-readable storage medium comprises computer-executable instructions for causing a processor to store a set of security vectors and a message authentication code for each of a plurality of devices; encrypt, using a transformation matrix comprising a set of security vectors of a transmitting device, both data to be transmitted by the transmitting device and a message authentication code of the transmitting device; decrypt received data using the transformation matrix of the transmitting device to provide both decrypted data and an extracted message authentication code; compare the stored message authentication code of the transmitting device with the extracted message authentication code; and process the decrypted data if the stored message authentication code of the transmitting device and the extracted message authentication code are equivalent.

BRIEF DESCRIPTION OF THE DRAWINGS

The drawings described herein are for illustration purposes only. The drawings are not intended to limit the scope of the present disclosure.

DETAILED DESCRIPTION

Reference is now made in detail to embodiments of the present disclosure. While certain embodiments of the present disclosure are described, it will be understood that it is not intended to limit the embodiments of the present disclosure to the disclosed embodiments. To the contrary, reference to embodiments of the present disclosure is intended to cover alternatives, modifications, and equivalents as may be included within the spirit and scope of the embodiments of the present disclosure as defined by the appended claims.

A Secure Embedded System (SES) is presented as an integral part of a subsystem that attaches within a communications model, such as, for example a typical seven layer OSI Model and is closely linked between the bottom three layers of that model, namely the Network Layer, the Data Layer and the Physical Layer. The SES is designed to provide an uninterruptable and secure communication channel between two or more devices, devices, and/or nodes within a communications network such as a cloud or web infrastructure that are defined by the SES JO boundary. Such devices, devices, and nodes can include, for example, computers, mobile devices such as smart phones, network routers, etc. As used herein, the SES JO boundary, or SES boundary, refers to the boundary surrounding the group of devices that all contain and use the SES. The security of the systems on which an SES is installed or implemented can be achieved by encrypting the data that is transmitted between multiple devices. Any data that is received by a device within an SES boundary will be scrutinized by the SES to check if it meets the requirements for being allowed into the system. The encryption performed by the SES provides the ability to check the integrity and authenticity of data transmitted from and received by a device within the SES. Each SES in the network stores a set of parametric vectors that uniquely define the device in which the SES is embedded and is used to both encode and decode data. The set of parametric vectors includes information that uniquely identifies a particular SES. If data received by a particular SES does not meet the specified requirements, the data is not allowed into the device being protected by the SES.

Figure 1:
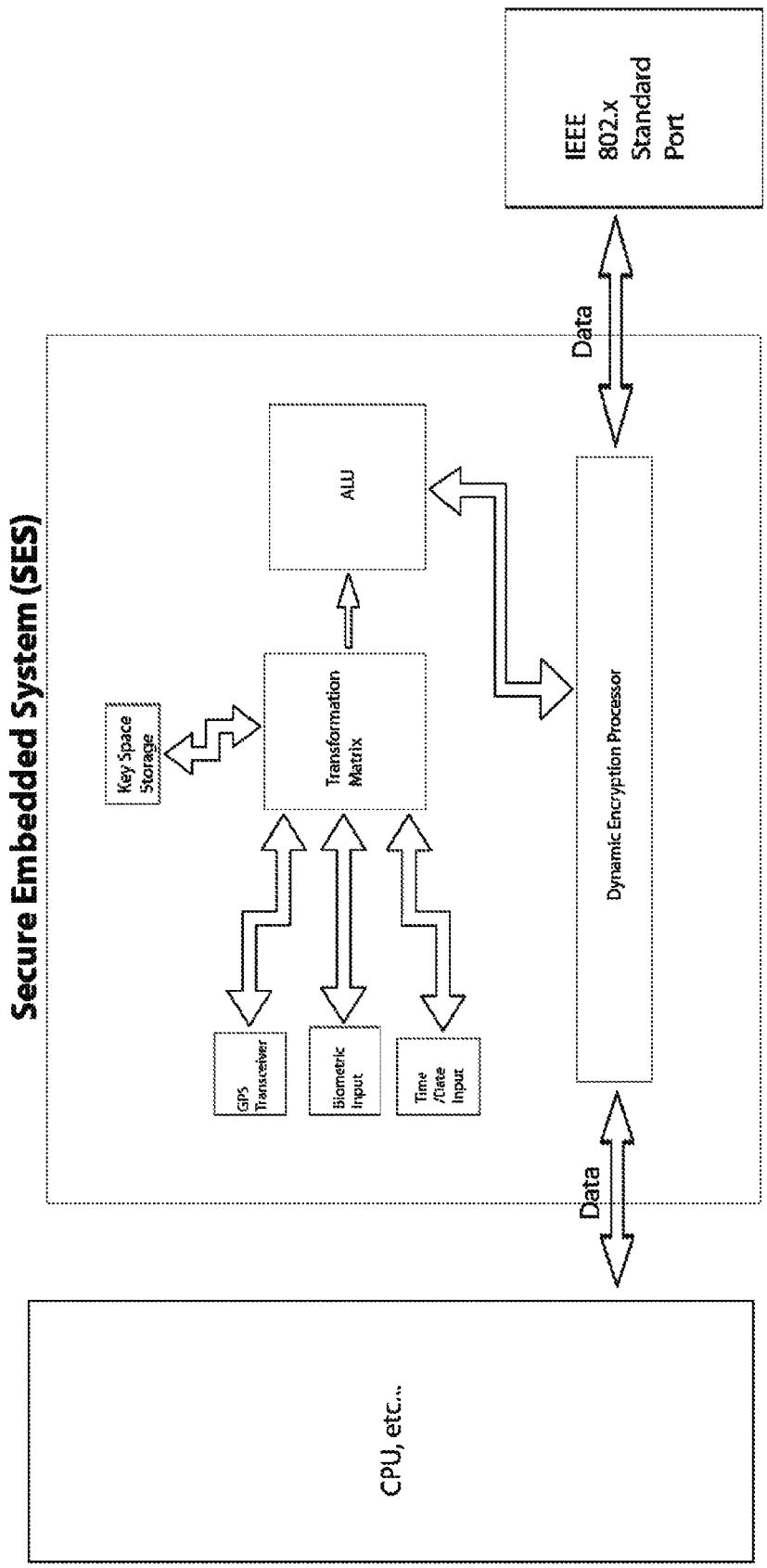
FIG. 1 shows a schematic diagram of a physical implementation of a Secured Embedded System according to certain embodiments.

FIG. 1 shows a physical implementation of a SES according to certain embodiments. As shown in FIG. 1, an SES may be physically implemented between the physical interface of a device such as an IEEE 802.x interface and other hardware of a device such as the CPU, memory, buffers, drivers, etc., on which it is installed. The SES shown in FIG. 1 includes a transformation matrix configured to communicate with a key storage space and security vectors that uniquely define a particular SES. The key storage space saves the unique keys or security vectors for each of the devices within the network. The security vectors are constructed from information such as location of the device determined, for example, using a GPS receiver; biometric information about a user of the device obtained, for example, using a biometric input device; a time/date stamp of the device, and/or other identifying information. The transformation matrix is constructed from the parametric security vectors and forwarded to an arithmetic logic unit (ALU). In certain embodiments, the key storage space contains a separate security vector for each different type of information; such types of information include biometric information, timestamp information, location information, etc. Therefore, in certain implementations, the key storage space can contain a vector generated based on biometric information, another vector generated based on timestamp information, another vector generated based on location information, etc.

As shown in FIG. 1, data from the processor (CPU) can be processed by a dynamic encryption processor using the transformation matrix to encrypt data to be transmitted. Conversely, data received through an external communications interface (IEEE 802.x Standard Port) can be decrypted by the dynamic encryption processor using the transformation matrix.

Figure 2:
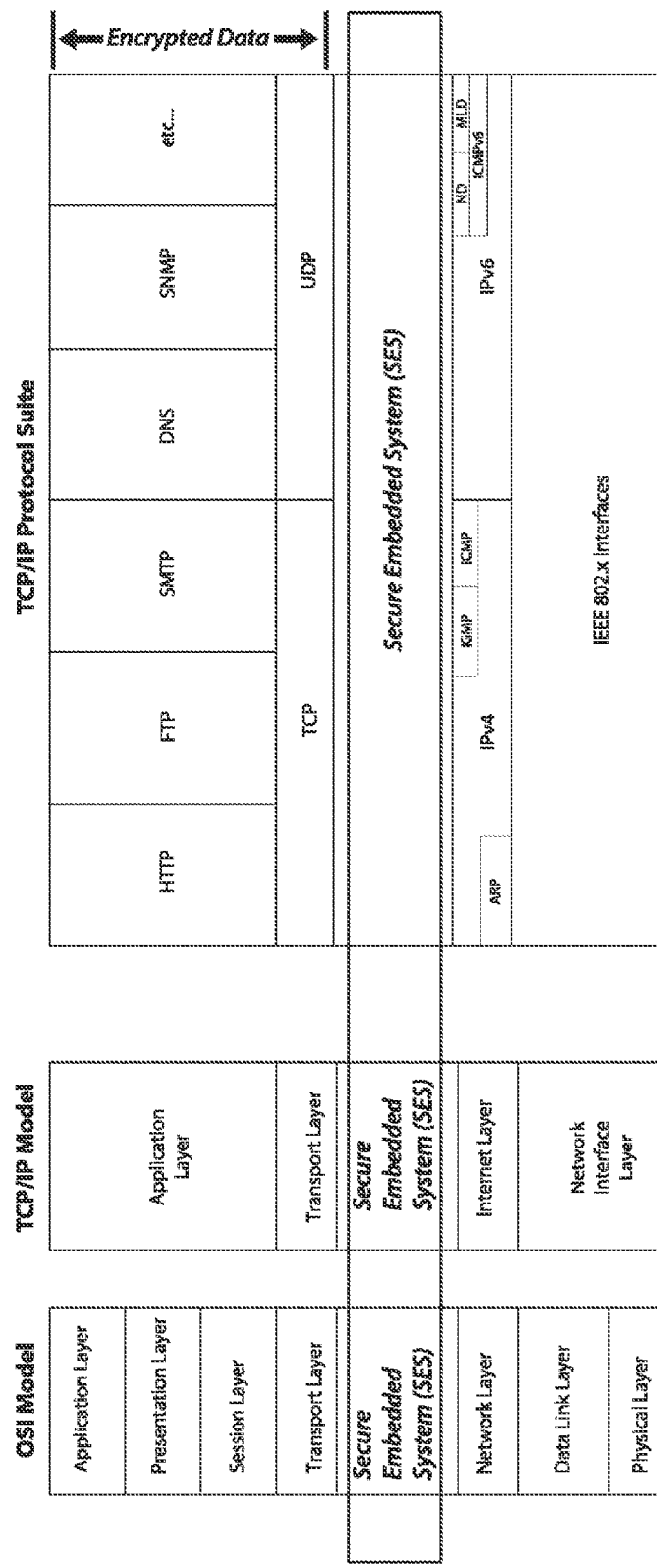
FIG. 2 shows a schematic diagram of a logical representation of a Secured Embedded System according to certain embodiments.

FIG. 2 shows a schematic diagram of the logic representation of an SES. FIG. 2 shows an outline of the logic for communications based on the OSI model and the TCP/IP model. However, other communication models can also be used. The SES can be logically embedded below the Transport Layer of a communications model. The SES can encrypt/decrypt data at the Transport Layer and higher layers. For example, referring to the OSI Model, data can be encrypted/decrypted corresponding to the Transport Layer, the Session layer, the Presentation Layer, and the Application Layer. Similarly, referring to the TCP/IP Model, data can be encrypted/decrypted corresponding to the Transport Layer and the Application Layer. In certain implementations, logical layers beneath the SES are not encrypted/decrypted. For example, referring to the OSI Model, data corresponding to the Network Layer, the Data Link Layer, and the Physical Layer are not encrypted/decrypted; and for the TCP/IP Model data corresponding to the Internet Layer and the Network Interface Layer are not encrypted/decrypted. Other layers may be included in any particular communications model.

FIG. 2 also shows an expanded representation of the TCP/IP Protocol suite and indicating in greater detail certain protocols that can be encrypted/decrypted by the SES.

According to an embodiment of the invention, a communications network to be secured can be initially identified. The network includes at least two devices or may include a plurality of devices. A device includes any physical device such as, for example, a computer, main frame, server, portable electronic device, personal digital assistant, and others. In certain embodiments, an SES may not be physical implemented on a device but may reside in a separate unit or device that is shared among other devices within a network such as, for example, a router or a server. Each of the devices within the network may include a physical implementation of an SES or an SES may be located at a local device, common device, central device, or at multiple distributed devices. Examples of networks include local area networks at branches of a bank or offices of a law firm; virtual private networks (VPNs); wide area networks; the Internet; etc.

All devices and/or SES group members within a secured network can be preconfigured to be unique for a particular group. Each member of a network to be secured can share the common preconfigured features of un-initialized security vectors, known media access control addresses stored in non-volatile memory, an embedded operating system, and a proprietary routing protocol used for communication between SES devices. The media access control addresses can be used to generate a unique message authentication code (MAC) associated with the device or device in which the media access control address is embedded.

Each device has a unique set of dynamic security vectors that uniquely define a particular device. The security vectors can include information about, for example, location, user identity, time/date information, clock information, and/or others. The security vectors can be used to encrypt/decrypt data packets. The security vectors can be multidimensional and exist in a parametric vector space that uniquely identifies every device within a network This includes, for example, a geo-physical location of every device within the network, biometric information (fingerprint, voice, image, etc.) of a user of a particular device, and the time/date stamp as referenced by a device within a network. These inputs can be transformed to an n-dimensional vector space that uniquely defines unique and dynamic keys or set of security vectors used to encrypt/decrypt data using a transformation matrix. The security vectors are dynamic in that they are periodically calculated and updated.

To establish the secured network, the set of security vectors for each of the devices within the secured network can be first shared among the devices and stored. The settings can be first preconfigured and the security vectors initialized and stored in non-volatile memory. The security vectors can be periodically updated. The security vectors can also be associated with the corresponding Internet Protocol (IP) address of the nodes or devices to which they pertain. All future communications between devices within the network or group will use the respective security vectors to encrypt data and to authenticate communications. In certain implementations, each device within the secured network begins with an original set of "seed" security vectors that are unique to that device and which that device generates itself. Each device securely transmits its seed security vectors to each other device within the secured network. These other devices receive and store these seed security vectors. Consequently, each device in the secured network initially stores a copy of the seed security vectors of each of the other devices within the network.

In certain embodiments, each device in the secured network can also store a copy of a program that can be used to generate a set of derivative vectors based on a set of seed vectors. Because each device stores a copy of the same generation program, the application of that generation program to a particular set of seed vectors produces a particular set of derivative vectors regardless of which device in the network applies the program. Thus, each device in the secured network can apply the same generation program to a particular device's seed security vectors to produce a same first set of derivative vectors for that particular device. The generation program can be applied to a first set of derivative vectors to produce a second set of derivative vectors. Over time, at each device in the secured network, the set of vectors corresponding to other devices in the network can be evolved congruently, such that each device ends up producing the same set of derivative vectors for a particular device, and different sets of derivative vectors for different devices. At any given moment in time, each device in the secured network will store the same set of derivative vectors for a particular device, and this set of vectors will evolve in the same manner over time at each device in the network.

In certain embodiments, additionally or alternatively, devices in the network periodically can generate new seed vectors based on information potentially changed from original information that served as the basis for former seed vectors generated by those devices. For example, as time passes, or as a particular device moves from location to location (thereby changing its GPS coordinates), the information that a device uses to generate at least some of its seed vectors can change. Consequently, when the devices in the secured network generate new seed vectors, these new vectors can vary from the seed vectors that those devices previously generated. As before, with each new generation of seed vectors, each device in the secured network can securely share its seed vectors with each other device in the secured network, so that each device in the network stores a copy of each other device's seed vectors (and the various devices' transformation matrices composed from those vectors).

At a transmitting device, both data to be transmitted and the message authentication code associated with the transmitting device, which collectively may be in the form of a vector, can be encrypted using the using a transformation matrix such as a linear transformation matrix to provide encrypted data. In certain embodiments, a transmitting device can encrypt data by multiplying its own transformation matrix by the data that is to be encrypted. The transmitting device's transformation matrix is made up of that transmitting device's own set of vectors (initially its own seed vectors, but later its own derivative vectors as time passes). In certain implementations, a transmitting device can encrypt data by performing a series of logical "OR" operations between each of the vectors in its own transformation matrix and the data to be encrypted, such that the output of one logical operation can be used as the input for a next logical operation in the series, ultimately generating the encrypted data.

As disclosed herein, data corresponding to the Transport Layer and above for a particular communications protocol can be encrypted. In certain implementations, a transmitting device divides the data to be encrypted into separate payloads, and places such payloads into separate data packets. The transmitting device encrypts each data packet separately. In certain implementations, a transmitting device derives a different set of its own security vectors for each such separate data packet; as a result, each such data packet is encrypted based on a different set of derived security vectors. The encrypted data, but not the security vector used to encrypt the data, is transmitted to a receiving device. A copy of the received encrypted data can be stored in a buffer and decrypted using the receiving device's copy of the transformation matrix (and constituent security vectors) associated with the transmitting device. The receiving device can derive the same transformation matrices of the transmitting device that the transmitting device derived. The receiving device can use these derived transformation matrices of the transmitting device to decrypt the packets received from the transmitting device. A copy of the decrypted data can then be stored in a buffer at the receiving device.

In certain embodiments, a transmitting device places its own unique MAC into each packet to be transmitted prior to encrypting that packet. The MAC can be placed into a field of a packet header prior to encryption, appended to the payload of the packet prior to encryption, or embedded or interleaved within the data to be transmitted, for example. To authenticate the transmission, following packet decryption, the MAC of the sending or transmitting device can be compared with the MAC extracted from the decrypted packet on the receiving device. If the MAC of the transmitting device and the extracted MAC match, then it is determined that the sender is authentic and that the data are authentic. If the data are authentic, then the receiving device can permit applications executing on the receiving device, or downstream of it, to process that data. Alternatively, if the data are not authentic, then the receiving device can prevent such applications from processing that data; the receiving device can erase the data from its buffer without making that data available to those applications.

In certain embodiments, the data can be divided into multiple packets and encrypted and decrypted on the basis of multiple packets. Depending on the level of security desired, the size of the data segments encrypted/decrypted with a particular transformation matrix and inserted MAC may vary and may be established when the SES is initialized or may be dynamically changed as determined by a user or by an administrator or on the basis of the content of the data being transmitted.

To add a level of dynamic key generation, the time/date vector can be based on an internal clock that is unique to the set of SES and will be updated based on a predefined increment/decrement parameter of the clock. Each SES can be synchronized with respect to the clock that is used to encrypt data, allowing for slight variances among devices within the network.

Figure 3:
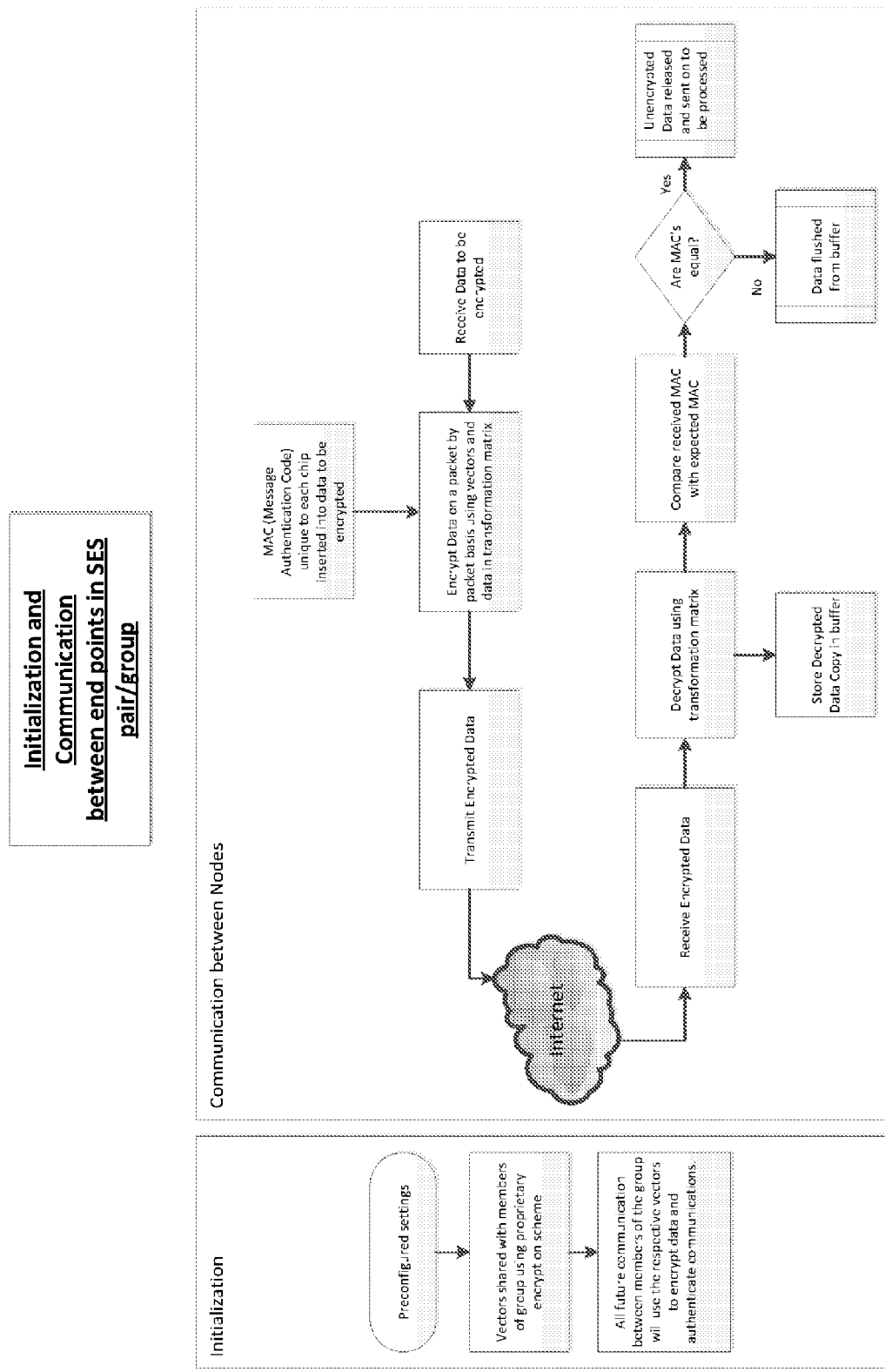
FIG. 3 shows a flow diagram of steps of methods for initializing and communication between end points in a Secured Embedded System.

FIG. 3 shows steps in methods for secured communications provided by the present disclosure. A network or group to be secured using methods and apparatus provided by the present disclosure is first defined. The network to be secured may comprise a plurality of devices, devices, or users. During the initialization process, settings for each device within a secured system are established or preconfigured. The settings include, for example, the dynamic security vector and the MAC for each device. The dynamic security vectors and the MAC can then be shared with each device or user within the group using an encryption scheme proprietary to the group. Subsequent communications between or among members of the group can use dynamic security vectors to encrypt data, decrypt data, and authenticate communications.

A communications process is also summarized in FIG. 3. At a transmitting device, data to be transmitted can be encrypted on a packet by packet basis using the dynamic security vectors and data in a transformation matrix. The MAC, which can be unique to each device within the group, is inserted into the data to be encrypted. The MAC is encrypted along with the data to be transmitted. The MAC can be a unique vector associated with the hardware such as the processor on which the method is implemented. The encrypted data and MAC can then be transmitted to a receiving device over a network such as the Internet. A receiving device receives the encrypted data and the encrypted data is decrypted using a transformation matrix comprising the dynamic security vectors and MAC of the transmitting device to provide decrypted data and a calculated MAC of the transmitting device. As disclosed herein, the receiving device can derive various editions of the transmitting device's transformation matrix using a program commonly possessed by the transmitting and receiving devices; the receiving device can apply the program to the receiving device's copy of the transmitting device's seed vectors a specified quantity of times (e.g., based on a current clock) to derive the correct edition of the transmitting device's derived vectors to decrypt the received packets, for example. A copy of the decrypted data can be stored in a buffer. The MAC of the transmitting device can then be compared to the MAC extracted from the decrypted packet. If the MAC of the transmitting device and the extracted MAC are equivalent then the decrypted data can then be released from the buffer and sent for processing by the receiving device or application executing thereon, or transmitted on to a further destination for processing (e.g., if the receiving device is a router). For example, if the decrypted data are TCP packets and if the receiving device is a router, then that router can forward those decrypted TCP packets on toward an intended destination. Alternatively, if the MAC of the transmitting device and the extracted MAC do not match, then the decrypted data is not processed and may be flushed from the buffer.

Figure 4:
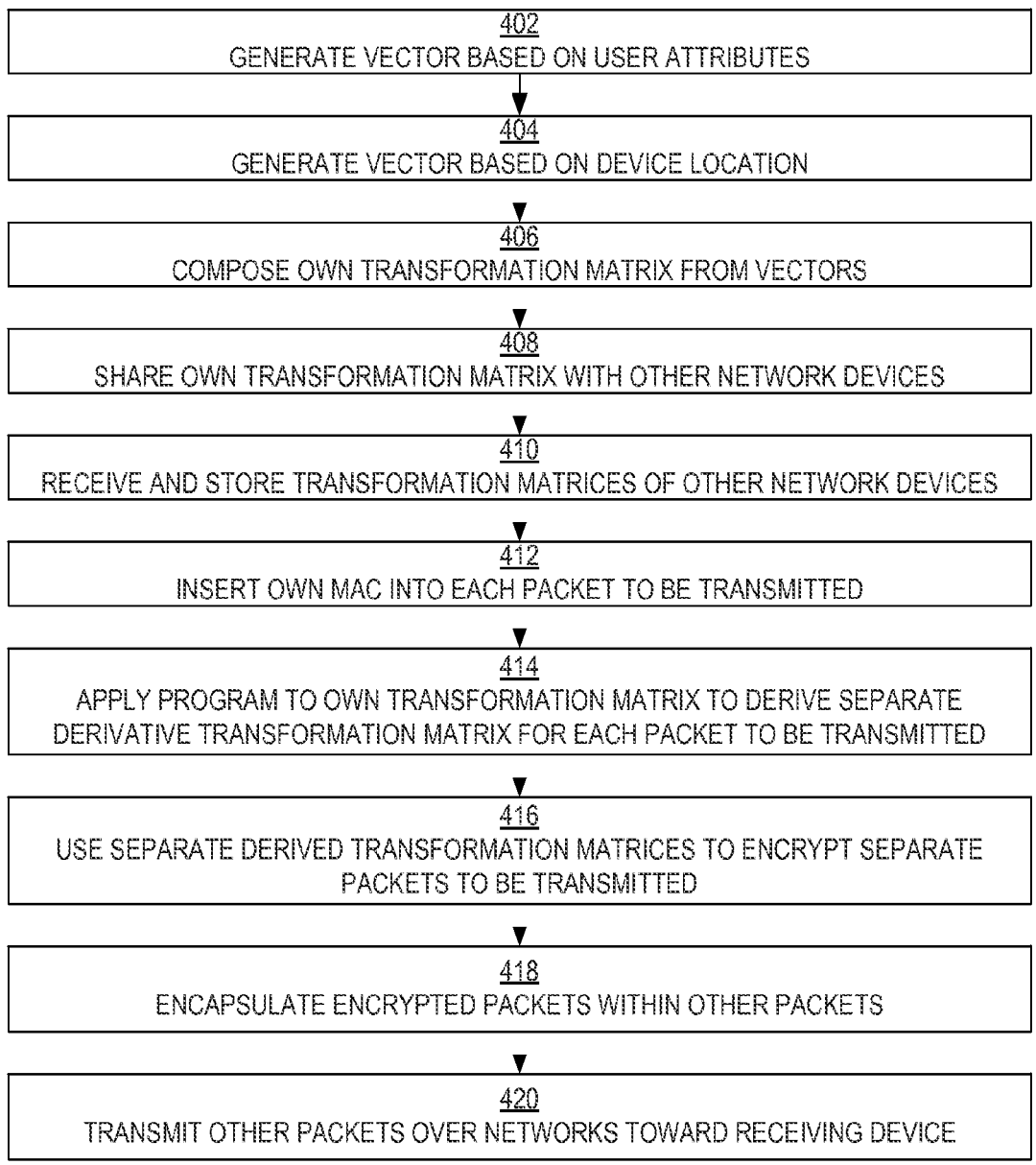
FIG. 4 is a flow diagram that illustrates an example of a technique for generating a transformation matrix and using that transformation matrix to encrypt packets containing a MAC, according to an embodiment of the invention.

FIG. 4 is a flow diagram that illustrates an example of a technique for generating a transformation matrix and using that transformation matrix to encrypt packets containing a MAC, according to an embodiment of the invention. In block 402, a transmitting device generates a vector based on user attributes. For example, the vector can be generated based on biometric information of the device's user. In block 404, the transmitting device generates a vector based on the transmitting device's current location. For example, the location can be determined using GPS. In block 406, the transmitting device composes its own transformation matrix from the vectors. In block 408, the transmitting device shares its own transformation matrix with other network devices. In block 410, the transmitting device receives and stores transformation matrices of other network devices. In block 412, the transmitting device inserts its own MAC into each packet to be transmitted. In block 414, the transmitting device applies a program to its own transformation matrix to derive separate derivative transformation matrices for each packet to be transmitted. In block 416, the transmitting device uses the separate derived transformation matrices to encrypt the separate packets (e.g., TCP packets) to be transmitted. In block 418, the transmitting device encapsulates the encrypted packets within other packets. In block 420, the transmitting device transmits these other packets over network(s) toward an intended receiving device.

Figure 5:
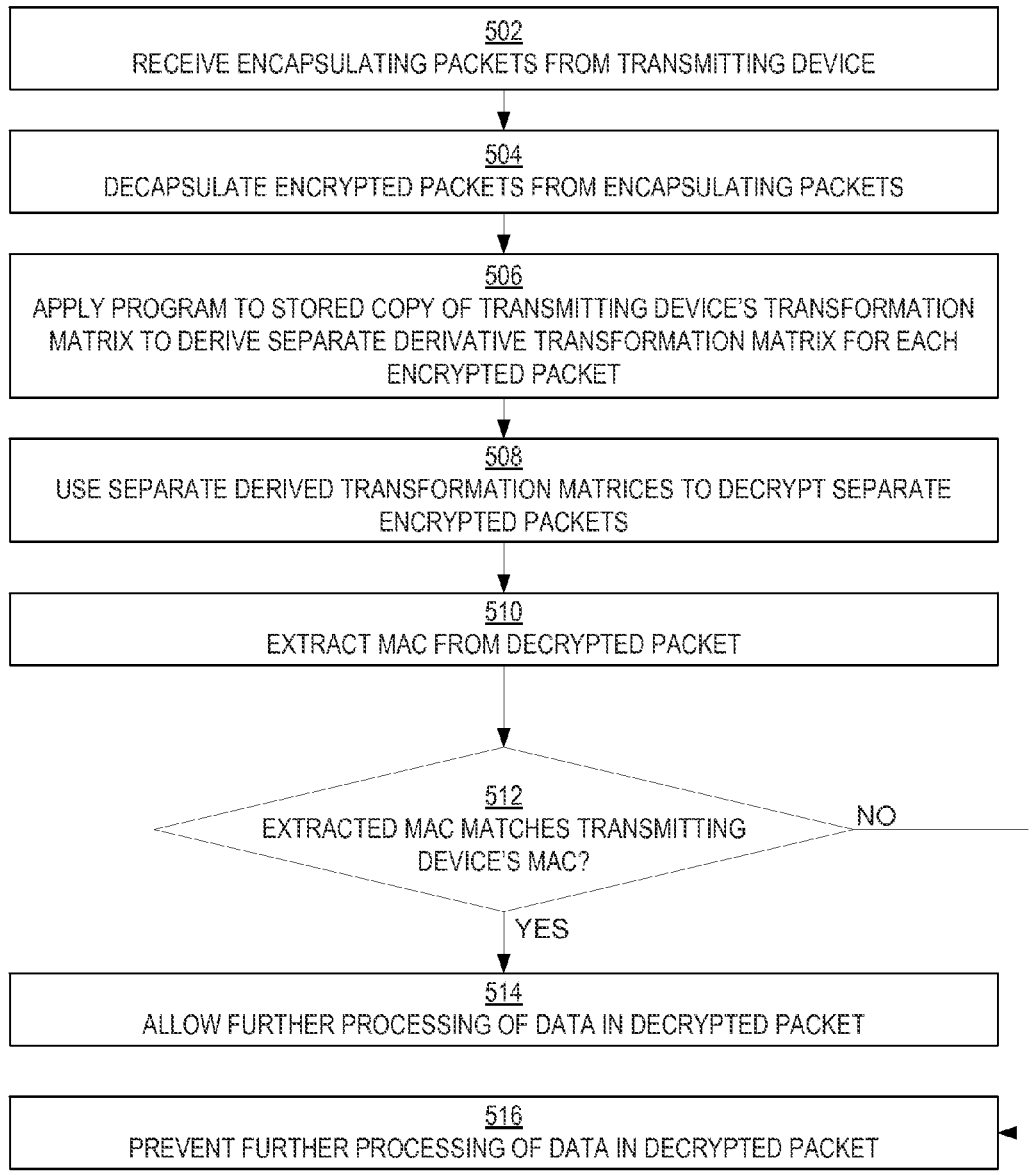
FIG. 5 is a flow diagram that illustrates an example of a technique for decrypting packets based on a stored copy of a transmitting device's transformation matrix and for authenticating the data within those packets based on a MAC of the transmitting device, according to an embodiment of the invention.

FIG. 5 is a flow diagram that illustrates an example of a technique for decrypting packets based on a stored copy of a transmitting device's transformation matrix and for authenticating the data within those packets based on a MAC of the transmitting device, according to certain embodiments. In block 502, a receiving device receives encapsulating packets from the transmitting device over network(s). In block 504, the receiving device de-encapsulates encrypted packets from the encapsulating packets. In block 506, the receiving device applies a program (i.e., a copy of the same program used in block 414 of FIG. 4) to its stored copy of the transmitting device's transformation matrix to derive separate a derivative transformation matrix for each encrypted packet. In block 508, the receiving device uses the separate derived transformation matrices to decrypt separate encrypted packets; the receiving device may use a different transformation matrix per encrypted packet to decrypt that packet. The operations of blocks 510-516 can be performed per each decrypted packet, but are discussed in the context of a single such packet for sake of simplicity. In block 510, the receiving device extracts a MAC from a decrypted packet. In block 512, the receiving device determines whether the extracted MAC matches the transmitting device's MAC. If so, then control passes to block 514. Otherwise, control passes to block 516. In block 514, the receiving device allows further processing of the data contained in the decrypted packet. Alternatively, in block 516, the receiving device prevents further processing of the data contained in the decrypted packet.

The systems and methods for securing communications disclosed herein provide the following advantages: (1) leverages current methodologies to utilize aspects that are known to work and improve and/or replace others that do not; (2) transparent implementation to the user of the system and does not require any configuration by the user to make the system secure; (3) the method is independent of the operating system; (4) the security provided by the SES cannot be accessed by outside sources; (4) all information encapsulated by the transport layer and above of a packet is encrypted/decrypted; (5) a unique set of parametric security vectors for each device is used to encrypt/decrypt data; and (6) encryption/decryption keys are not transmitted after the secured network is established.

Embodiments of the present disclosure may be implemented on a computer system. The user interfaces described herein may be implemented within a computer system. A computer system may be implemented as any of various computing devices, including, e.g., a desktop or laptop computer, mobile device, tablet computer, smart phone, phone, personal data assistant (PDA), multimedia device (e.g., television or Blu-Ray player) or any other type of computing and/or telecommunications device, not limited to any particular form factor. A computer system can include processing unit(s), a storage subsystem, input devices, output devices, a network interface, and a bus.

Figure 6:
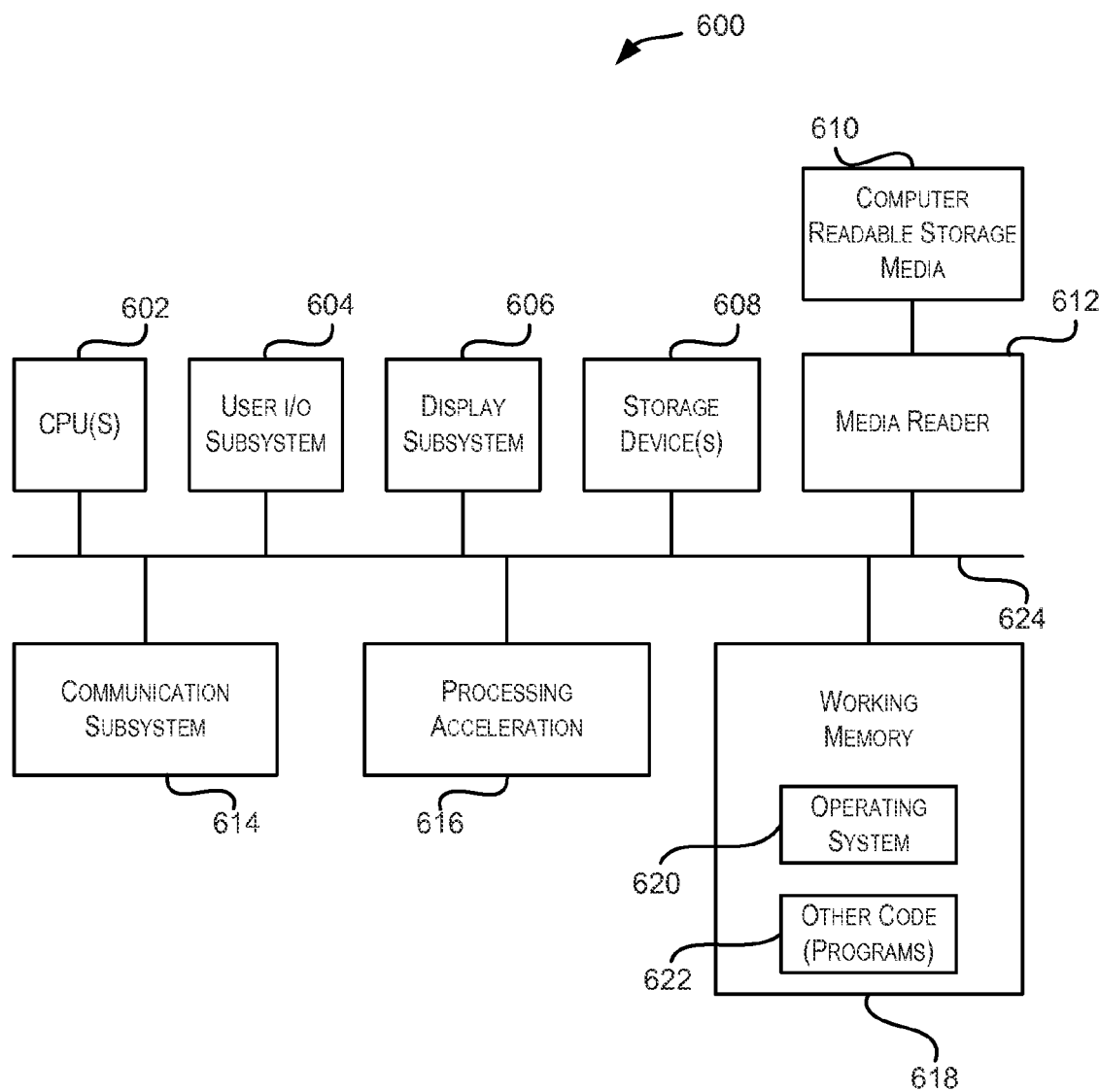
FIG. 6 is a simplified block diagram of a computer system that may be used in accordance with embodiments of the present invention.

FIG. 6 is a simplified block diagram of a computer system 600 that may be used in accordance with embodiments of the present disclosure. Computer system 600 can include the SES shown in FIG. 1. Computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). Computer system 600 may also include one or more storage devices 608. By way of example, the storage device(s) 608 may include devices such as disk drives, optical storage devices, and solid-state storage devices such as a random access memory (RAM) and/or a read-only memory (ROM), which can be programmable, flash-updateable and/or the like.

Computer system 600 may additionally include a computer-readable storage media reader 612, a communications subsystem 614 (e.g., a modem, a network card (wireless or wired), an infra-red communication device, etc.), and working memory 618, which may include RAM and ROM devices as described above. In some embodiments, computer system 600 may also include a processing acceleration unit 616, which can include a digital signal processor (DSP), a special-purpose processor, and/or the like.

Computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. Communications system 614 may permit data to be exchanged with a network and/or any other computer described above with respect to a system environment.

Computer system 600 may also comprise software elements, shown as being currently located within working memory 618, including an operating system 620 and/or other code 622, such as an application program. In an exemplary embodiment, working memory 618 may include executable code and associated data structures used for encrypting and decrypting data. It should be appreciated that alternative embodiments of computer system 600 may have numerous variations from that described above. For example, customized hardware might also be used and/or particular elements might be implemented in hardware, software (including portable software, such as applets), or both. Further, connection to other computing devices such as network input/output devices may be employed.

Processing unit(s) can include a single processor, which can have one or more cores, or multiple processors. In certain embodiments, processing unit(s) can include a general purpose primary processor as well as one or more special purpose co-processors such as graphics processors, digital signal processors, or the like. In certain embodiments, some or all processing units can be implemented using customized circuits, such as application-specific integrated circuits (ASICs) or field programmable gate arrays (FPGAs). In certain embodiments, such integrated circuits execute instructions that are stored on the circuit itself. In certain embodiments, processing unit(s) can execute instructions stored in storage subsystem.

A storage subsystem can include any combination of computer readable storage media including semiconductor memory chips of various types (DRAM, SRAM, SDRAM, flash memory, programmable read-only memory) and so on. Magnetic and/or optical disks can also be used. In certain embodiments, a storage subsystem can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic "floppy" disks, and so on. A computer readable storage media do not include carrier waves and transitory electronic signals passing wirelessly or over wired connections.

In certain embodiments, a storage subsystem can store one or more software programs to be executed by processing unit(s), such as a user interface. Software can refer to sequences of instructions that, when executed by processing unit(s) cause a computer system to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From a storage subsystem, processing unit(s) can retrieve program instructions to execute and data to process in order to execute various operations described herein.

Certain embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

A computer system can have other capabilities not specifically described here (e.g., mobile phone, global positioning system (GPS), power management, one or more cameras, various connection ports for connecting external devices or accessories, etc.). Further, while computer system is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Thus, for example, certain embodiments provided by the present disclosure provide a computer program product stored on a non-transitory computer-readable storage medium comprising computer-executable instructions for causing a processor to: store a unique set of security vectors for each of a plurality of devices; encrypt data to be transmitted by a transmitting device using the unique security vector for a receiving device using a transformation matrix; decrypt transmitted data using the unique security vector of the receiving device using a transformation matrix to provide decrypted data; re-encrypt the decrypted data using the unique security vector of the receiving device using a transformation matrix to provide re-encrypted data; compare the encrypted data with the re-encrypted data; and processes the decrypted data if the encrypted data matches the re-encrypted data.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A method of securing communications among a plurality of devices Comprising a group, wherein the method comprises:
    storing a transformation matrix comprising a set of security vectors for each of the plurality of devices, wherein the plurality of devices comprises a transmitting device and a receiving device;
    storing a message authentication code for each of the plurality of devices;
    encrypting, using the transformation matrix comprising the set of security vectors of the transmitting device, both data to be transmitted by the transmitting device and the message authentication code of the transmitting device to provide both encrypted data and an encrypted message authentication code;
    transmitting the encrypted data from the transmitting device;
    receiving the encrypted data by the receiving device;
    decrypting the encrypted data using the transformation matrix comprising the set of security vectors of the transmitting device to provide both decrypted data and an extracted message authentication code;
    comparing the stored message authentication code of the transmitting device with the extracted message authentication code; and
    processing the decrypted data if the stored message authentication code of the transmitting device is equivalent to the extracted message authentication code;
    wherein the set of security vectors for each of the plurality of devices comprises vectors comprising information selected from a geo-physical location of a device, biometric information of a user of a device, a time/date stamp associated with a device, and a combination of any of the foregoing.

2. The method of claim 1, wherein encrypting data comprises encrypting data at a transport layer and higher layers of a communications model.

3. A method of securing communications among a plurality of devices comprising a group, wherein the method comprises:
    establishing a group comprising a plurality of devices, wherein each of the plurality of devices is characterized by a set of security vectors; and
    the plurality of devices comprises a transmitting device and a receiving device;
    storing a transformation matrix comprising the set of security vectors for each of the plurality of devices;
    storing a unique message authentication code for each of the plurality of devices;
    encrypting, using the transformation matrix comprising the set of security vectors associated with the transmitting device, both data to be transmitted by the transmitting device and a unique message authentication code of the transmitting device;
    transmitting the encrypted data from the transmitting device;
    receiving the encrypted data at the receiving device;
    decrypting the encrypted data using the transformation matrix comprising the set of security vectors of the transmitting device to provide both decrypted data and an extracted message authentication code;
    storing a copy of the decrypted data in a buffer;
    comparing the stored unique message authentication code of the transmitting device with the extracted message authentication code; and
    processing the decrypted data if the stored unique message authentication code of the transmitting device is equivalent to the extracted message authentication code;
    wherein the unique set of security vectors for each of the plurality of devices comprises vectors comprising information selected from a geo-physical location of a device, biometric information of a user of a device, a time/date stamp associated with a device, and a combination of any of the foregoing.

4. The method of claim 3, wherein encrypting data comprises encrypting data at a transport layer and higher layers of a communications model.

5. The method of claim 3, wherein encrypting data comprises embedding the unique message authentication code of the transmitting device in the data to be encrypted and encrypting the data to be transmitted and the embedded unique message authentication code.

6. The method of claim 3, comprising deleting the stored copy of the decrypted data if the unique message authentication code of the transmitting device is not equivalent to the extracted message authentication code.

7. The method of claim 3, wherein storing the unique set of security vectors for each of the plurality of devices comprises storing a unique IP address.

8. The method of claim 3, comprising sharing the unique set of security vectors for each of the plurality of devices among each of the plurality of devices within the group.

9. An encryption/decryption processor, comprising:
    a storage unit for storing a transformation matrix comprising a set of security vectors and a message authentication code for each of a plurality of devices;
    an encryption unit for encrypting, using the transformation matrix based on the set of security vectors for a transmitting device, both data to be transmitted and a message authentication code of the transmitting device;
    a decryption unit for decrypting received data using a transformation matrix of a transmitting device to provide both decrypted data and an extracted message authentication code;
    a comparison unit for comparing the stored message authentication code of the transmitting device with the extracted message authentication code; and
    a processing unit for processing the decrypted data if the stored message authentication code of the transmitting device and the extracted message authentication code are equivalent;
    wherein the set of security vectors for each of the plurality of devices comprises vectors comprising information selected from a geo-physical location of a device, biometric information of a user of a device, a time/date stamp associated with a device, and a combination of any of the foregoing.

10. The processor of claim 9, wherein encrypting data comprises encrypting data at a transport layer and higher layers of a communications model.

11. A system for secured network communications within a group comprising a plurality of devices and a network device, wherein the network device comprises the encryption/decryption processor of claim 9.

12. The system of claim 11, wherein encrypting data comprises encrypting data at a transport layer and higher layers of a communications model.

13. A computer program product stored on a non-transitory computer-readable storage medium comprising computer-executable instructions for causing a processor to:
store a transformation matrix comprising a set of security vectors and a message authentication code for each of a plurality of devices;
encrypt, using the transformation matrix comprising set of security vectors of a transmitting device, both data to be transmitted by the transmitting device and a message authentication code of the transmitting device;
decrypt received data using the transformation matrix of the transmitting device to provide both decrypted data and an extracted message authentication code;
compare the stored message authentication code of the transmitting device with the extracted message authentication code; and
process the decrypted data if the stored message authentication code of the transmitting device and the extracted message authentication code are equivalent;
wherein the set of security vectors for each of the plurality of devices comprises vectors comprising information selected from a geo-physical location of a device, biometric information of a user of a device, a time/date stamp associated with a device, and a combination of any of the foregoing.

14. The computer program product of claim 13, wherein encrypting data comprises encrypting data at a transport layer and higher layers of a communications model.

15. The computer program product of claim 13, wherein the instructions cause the processor to:
derive a derivative set of security vectors corresponding to the transmitting device based on a seed set of security vectors corresponding to the transmitting device;
wherein the transformation matrix comprises the derivative set of security vectors;
encrypting a first packet based on a first derivative set of security vectors corresponding to the transmitting device; and
encrypting a second packet based on a second derivative set of security vectors corresponding to the transmitting device;
wherein the first derivative set differs from the second derivative set.

16. The computer program product of claim 15, wherein the instructions cause the processor to:
process the seed set of security vectors using a program possessed by each device of the plurality of devices to produce a derivative set of security vectors.

17. The computer program product of claim 13, wherein the set of security vectors for a particular device of the plurality of devices comprises at least one security vector that the particular device generated based on one or more attributes of a user of the particular device.

18. The computer program product of claim 13, wherein the set of security vectors for a particular device of the plurality of devices comprises at least one security vector that the particular device generated based on a current location of the particular device ascertained using a global positioning system.

* * * * *